(12) United States Patent
Li et al.

(10) Patent No.: US 11,461,558 B2
(45) Date of Patent: Oct. 4, 2022

(54) METHOD FOR TRAINING A DECISION-MAKING MODEL WITH NATURAL LANGUAGE CORPUS

(71) Applicant: National Tsing Hua University, Hsinchu (TW)

(72) Inventors: Ya-Lun Li, Hsinchu (TW); Yun-Hsien Lin, Hsinchu (TW); Daw-Wei Wang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 243 days.

(21) Appl. No.: 16/875,636

(22) Filed: May 15, 2020

(65) Prior Publication Data
US 2021/0192148 A1 Jun. 24, 2021

(30) Foreign Application Priority Data
Dec. 20, 2019 (TW) ................................ 108146882

(51) Int. Cl.
*G06F 40/40* (2020.01)
*G06N 20/00* (2019.01)

(52) U.S. Cl.
CPC ............. *G06F 40/40* (2020.01); *G06N 20/00* (2019.01)

(58) Field of Classification Search
CPC .................................. G06N 20/00; G06N 3/02
See application file for complete search history.

(56) References Cited

U.S. PATENT DOCUMENTS

| 8,463,595 B1* | 6/2013 | Rehling | G06F 16/951 |
| | | | 706/50 |
| 9,633,007 B1* | 4/2017 | Brun | G06F 16/9024 |
| 2018/0232358 A1* | 8/2018 | Badenes | G06F 40/30 |
| 2019/0266240 A1* | 8/2019 | Georges | G06N 3/0445 |

(Continued)

FOREIGN PATENT DOCUMENTS

| CN | 109241285 A | 1/2019 |
| CN | 109446511 A | 3/2019 |

OTHER PUBLICATIONS

K. Kowsrihawat, P. Vateekul and P. Boonkwan, "Predicting Judicial Decisions of Criminal Cases from Thai Supreme Court Using Bi-directional GRU with Attention Mechanism," 2018 5th Asian Conference on Defense Technology (ACDT), 2018, pp. 50-55, doi: 10.1109/ACDT.2018.8592948. (Year: 2018).*

(Continued)

*Primary Examiner* — Richemond Dorvil
*Assistant Examiner* — Alexander G Marlow
(74) *Attorney, Agent, or Firm* — Birch, Stewart, Kolasch & Birch, LLP

(57) ABSTRACT

A machine-learning method for training a decision-making model includes: obtaining a rationale vector group for a rationale included in a labeled natural language text file; assembling an effective vector group for the labeled natural language text file by connecting the rationale vector groups for the rationales using a specific order; and executing a supervised classification algorithm to train the decision-making model using the effective vector group and a target decision for the natural language text file. The decision-making model is trained to be configured to label an unlabeled natural language text file using one of a plurality of potential decisions that serves as a target decision.

10 Claims, 5 Drawing Sheets

(56) References Cited

U.S. PATENT DOCUMENTS

| | | | | |
|---|---|---|---|---|
| 2020/0012919 | A1* | 1/2020 | Bathaee | G06Q 50/18 |
| 2020/0159826 | A1* | 5/2020 | Lev Tov | G06F 40/30 |
| 2020/0349229 | A1* | 11/2020 | Abudalfa | G06N 7/005 |
| 2021/0117508 | A1* | 4/2021 | Chang | G06F 40/279 |

OTHER PUBLICATIONS

S. Undavia, A. Meyers and J. E. Ortega, "A Comparative Study of Classifying Legal Documents with Neural Networks," 2018 Federated Conference on Computer Science and Information Systems (FedCSIS), 2018, pp. 515-522. (Year: 2018).*

S. Li, H. Zhang, L. Ye, X. Guo and B. Fang, "MANN: A Multichannel Attentive Neural Network for Legal Judgment Prediction," in IEEE Access, vol. 7, pp. 151144-151155, 2019, doi: 10.1109/ACCESS.2019.2945771. (Year: 2019).*

Sharma, M., Bilgic, M. Learning with rationales for document classification. Mach Learn 107, 797-824 (2018). https://doi.org/10.1007/s10994-017-5671-3 (Year: 2018).*

L. Yuan et al., "Automatic Legal Judgment Prediction via Large Amounts of Criminal Cases," 2019 IEEE 5th International Conference on Computerand Communications (ICCC), 2019, pp. 2087-2091, doi: 10.1109/ICCC47050.2019.9064408. (Year: 2019).*

X. Yang, X. Luo and Y. Liu, "Criminal Conviction Classification Based on Multiple Learning Methods," 2019 IEEE 14th International Conference on Intelligent Systems and Knowledge Engineering (ISKE), 2019, pp. 366-373, doi: 10.1109/ISKE47853.2019.9170293. (Year: 2019).*

Bingfeng Luo, Yansong Feng, Jianbo Xu, Xiang Zhang, and Dongyan Zhao. 2017. Learning to Predict Charges for Criminal Cases with Legal Basis. In Proceedings of the 2017 Conference on Empirical Methods in Natural Language Processing, pp. 2727-2736 (Year: 2017).*

Haoxi Zhong, Zhipeng Guo, Cunchao Tu, Chaojun Xiao, Zhiyuan Liu, and Maosong Sun. 2018. Legal Judgment Prediction via Topological Learning. In Proceedings of the 2018 Conference on Empirical Methods in Natural Language Processing, pp. 3540-3549 (Year: 2018).*

Aletras N, Tsarapatsanis D, Preoţiuc-Pietro D, Lampos V. 2016. Predicting judicial decisions of the European Court of Human Rights: a Natural Language Processing perspective. PeerJ Computer Science 2:e93 https://doi.org/10.7717/peerj-cs.93 (Year: 2016).*

Colin Bannard and Chris Callison-Burch. 2005. Paraphrasing with Bilingual Parallel Corpora. In Proceedings of the 43rd Annual Meeting of the Association for Computational Linguistics (ACL'05), pp. 597-604 (Year: 2005).*

Tomoyuki Kajiwara, Mamoru Komachi, and Daichi Mochihashi. 2017. MIPA: Mutual Information Based Paraphrase Acquisition via Bilingual Pivoting. In Proceedings of the Eighth International Joint Conference on Natural Language Processing (vol. 1: Long Papers), pp. 80-89 (Year: 2017).*

Law_translated.pdf, Github screenshot of the Law.csv file used in Kowsrihawat et al. (Year: 2018).*

Shangbang et al., "Automatic Judgment Prediction via Legal Reading Comprehension", arXiv:1809.06537, Sep. 18, 2018, https://arxiv.org/abs/1809.06537 Abstract, Chapters 1-6 of the body text, Figures 1-3, 10 pages.

Taiwanese Search Report for Taiwanese Application No. 108146882, dated Jul. 29, 2021, with an English translation.

Bhilare et al., "Predicting Outcome of Judicial Cases and Analysis using Machine Learning," International Research Journal of Engineering and Technology (IRJET), vol. 6, No. 3, Mar. 2019, pp. 326-330, 5 pages total.

Medvedeva et al., "Using machine learning to predict decisions of the European Court of Human Rights," Artificial Intelligence and Law, vol. 28, 2020, pp. 237-266, 30 pages total.

Taiwanese Search Report for Taiwanese Application No. 108146882, dated Mar. 2, 2021, with an English translation.

* cited by examiner

METHOD FOR TRAINING A DECISION-MAKING MODEL WITH NATURAL LANGUAGE CORPUS

CROSS-REFERENCE TO RELATED APPLICATION

This application claims priority of Taiwanese Patent Application No. 108146882, filed on Dec. 20, 2019.

FIELD

The disclosure relates to a method for training an artificial intelligence (AI) model, and more particularly to a machine-learning method for training a decision-making model with natural language corpus.

BACKGROUND

Conventionally, implementation of decision-making model using a machine-learning method involves the use of categorical data that is pre-labeled manually.

In the field of processing the categorical data (instead of natural language data, which include text and audio), according to one document "Predicting Family Court Cases by Machine-learning: An Application of Legal Informatics" published in 2017, information in a court case document may be manually labeled in the form of questionnaire which is human designed. For example, when a statement that a party has an annual income of NT$ 800,000 is included in the court case document, a domain expert may define options related to the statement, and an annotator may check one of a plurality of option boxes that fits the statement (e.g., an option box indicating an annual income between NT$ 800,000 and NT$ 1,000,000). Using this manner, categorical data associated with the court case document may be obtained and then used for training a machine-learning based decision-making model. For court case documents that have not been manually processed by the annotator, data mining may be employed to get the necessary information to fill the questionnaire, and then be fed into the decision-making model to predict the corresponding decision.

It is noted that, for a specific domain that is associated with a specific field (e.g., a court case document, a medical related document, etc.), the format of the questionnaire may need to be redesigned, the input of succeeding machine-learning model also needs to be changed based on the domain (including the questions, numbers of options associated with each of the questions, content of each of the options, etc.). Therefore, the method of using questionnaire which is designed for a specific domain may not be easily adopted to various domains (that is, a specifically designed questionnaire may not be universally applied for processing all kinds of documents).

In the field of processing natural language data (including text and audio), a number of methods, such as latent semantic analysis (LSA), latent dirichlet allocation (LDA), etc., are available to classify longer text files into semantic topics.

It is noted that while the above methods are capable of performing semantic topics classification, more detailed information may be needed to distinguish texts of similar semantic topics to properly train a decision-making model.

SUMMARY

Therefore, one object of the disclosure is to provide a method that can alleviate at least one of the drawbacks of the prior art.

According to one embodiment of the disclosure, a machine-learning method for training a decision-making model with natural language corpus is provided. The machine-learning method is implemented using a computer device including a data storage and a processor communicating with the data storage. The data storage stores a plurality of labeled natural language text files. Each of the plurality of labeled natural language text files is associated with a pre-labeled target decision included in a plurality of potential decisions, and includes a plurality of pre-labeled rationales associated with a target subject. The machine-learning method includes steps of:

a) for each of the labeled natural language text files, obtaining, by the processor, at least one rationale vector group for each of the plurality of rationales included in the labeled natural language text file;

b) constructing, by the processor, a first effective vector group for the labeled natural language text file by connecting the rationale vector groups respectively for the plurality of rationales using a first order; and c) executing, by the processor, a supervised classification algorithm to train the decision-making model using the first effective vector group and the target decision for each of the natural language text files, wherein the decision-making model is trained to be configured to label an unlabeled natural language text file using one of the potential decisions that serves as a target decision.

According to another embodiment of the disclosure, a machine-learning method for training a decision-making model with natural language corpus is provided. The method is implemented using a computer device that includes a data storage and a processor communicating with the data storage. The data storage stores a plurality of vector datasets. Each of the vector datasets is associated with a pre-labeled target decision included in a plurality of potential decisions and includes a plurality of rationale vector groups. Each of the rationale vector groups is associated with a natural language text or an audio reading describing a target subject. The machine-learning method includes the steps of:

a) constructing, by the processor, an effective vector group by connecting the rationale vector groups for the plurality of vector datasets using a specified order; and b) executing, by the processor, a supervised classification algorithm to train the decision-making model using the effective vector group and the target decision for each of the vector datasets, wherein the decision-making model is trained to be configured to label an unlabeled dataset using one of the potential decisions that serves as a target decision.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
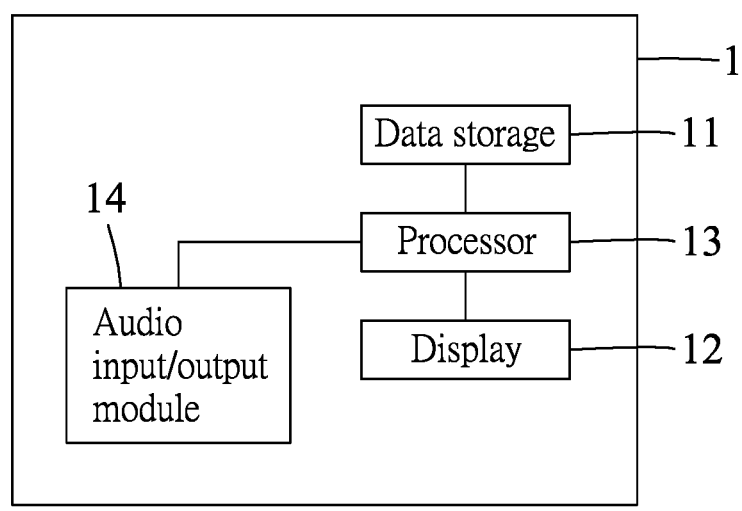
FIG. 1 is a block diagram illustrating a computer device that is used for implementing training of a decision-making model according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating a computer device 1 that is used for training of a machine-learning based model according to one embodiment of the disclosure. The computer device 1 may be embodied using a server, a personal computer, a laptop, a tablet, or other electronic devices.

The computer device 1 includes a data storage 11, a display 12, a processor 13, and an audio input/output module 14.

The data storage 11 may be embodied using one or more of a hard disk, a solid-state drive (SSD) and other non-transitory storage medium.

The processor 13 is connected to the data storage 11, the display 12 and the audio input/output module 14, and may include, but is not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The audio input/output module 14 may be embodied using an audio receiving component (e.g., a microphone), a speaker, and an audio recording component.

In some embodiments, the computer device 1 may include a communication component for connecting or communicating with other electronic devices. The communication component may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

In this embodiment, the data storage medium 11 stores a plurality of natural language text files constructed by texts in natural language. Each of the natural language text files is associated with a pre-labeled target decision included in a plurality of potential decisions, and includes a plurality of pre-labeled rationales associated with a target subject and/or an event. Specifically, the target subject is a human in this embodiment, but may be various objects or phenomenon that can be described.

In various embodiments, each of the natural language text files may further include at least one neutral text, a plurality of pre-labeled general statements, pre-labeled background statements associated with the target subject, or a combination thereof.

Specifically, the term "rationale" used in the disclosure refers to text words or sentences that may affect the pre-labeled target decision and that are deemed a positive description or a negative description of the target subject. That is to say, each of the rationales included in a natural language text file may be pre-labeled as a positive rationale or a negative rationale.

The term "background statements" used in the disclosure refers to the information associated with the target subject. For example, the background statements may include one or more pieces of categorical information, such as a gender of the target subject, an occupation of the target subject, a nationality of the target subject, a residence address of the target subject, a personality description of the target subject, and a criminal record of the target subject. In some embodiments, the background statements may include one or more pieces of numerical information, such as an age of the target subject, an income of the target subject, and a time period in which the target subject received education. In some embodiments, the background statements may include one or more pieces of textural information, such as a mood description of the target subject, a description of an environment in which the target subject grew up, etc.

The term "general statements" used in the disclosure refers to the information that are related to the record or the event, and that cannot be categorized into any one of the previously described terms (that is, cannot be categorized as the rationale or the background statement). For example, the general statements may include a time of occurrence of the event, a location at which the event occurred, a location at which a natural language text document describing the event was published, information regarding an author of the natural language text document, a source associated with the natural language text document, an institution associated with the event, at least one law provision used by a judge for judging the event, a division of a hospital that treats an injury associated with the event, etc.

The term "neutral text" used in the disclosure refers to text words or sentences that are not associated with the target subject, that cannot be determined as a positive description or a negative description of the target subject, and that do not affect the pre-labeled target decision.

In one example, the natural language text file may be an application for admission to a school filed by a candidate (who serves as the target subject). The application may be accepted or rejected, leading to one of the potential decisions. In this example, the data storage 11 may store a plurality of natural language text files (applications) each associated with one individual candidate.

In examining the applications, texts or sentences contained in each of the applications may first be labeled using the different types of data as described above. Specifically, the application may include a plurality of words or sentences that can be categorized as rationales, such as a family background of the candidate, personal hobbies of the candidate, academic performance of the candidate, experiences of group work of the candidate, future plans for learning of the candidate, etc. Afterward, the application may be associated with one of the potential decisions (acceptation or rejection) as the target decision.

In one example, the natural language text file may be a medical record for a patient (who serves as the target subject). The medical record may be examined to determine whether the patient is afflicted with one of a plurality of diseases, leading to one of the potential decisions for each disease. In this example, the data storage 11 may store a plurality of natural language text files (medical records) each associated with one individual patient.

In examining the medical records, texts or sentences contained in each of the medical records may first be labeled using the different types of data as described above. Specifically, the medical record may include a plurality of words or sentences that can be categorized as rationales, such as "sneezing, running nose, nasal congestion, headache, dizziness, mild sore throat, heavy coughs, abundance of phlegm, mild fever" that may be categorized as rationales with respect to a first biological system.

In some cases, the medical record may further include a plurality of words or sentences that can be categorized as rationales, such as "reduced appetite, constant weight loss, the sensation of incomplete bowel evacuation, bleeding, abdominal bloating, and flatulence" that may be categorized as rationales with respect to a second biological system.

Two target decisions may be labeled in terms of whether the patient is afflicted with a first disease, and whether the patient is afflicted with a second disease.

In this example, beside the above information, the medical record may further include doctor suggestions, such as "after taking the medication, please refrain from undertaking activities that may cause harm such as driving, operating machinery, etc.". Such information may be labeled as neutral text that is not associated with any one of the diseases of the target subject.

In one example, the natural language text file may be a court case decision that is associated with two parties (with each party serving as one target subject). In this example, the data storage 11 may store a plurality of natural language text files (court case decisions) each associated with at least two parties. The natural language text file may be examined to determine whether the decision favors a first party (e.g., a plaintiff or a petitioner), a second party (e.g., a defendant or a respondent), or neither, leading to one of three possible decisions.

In examining the court case decisions, texts or sentences contained in each of the court case decisions may first be labeled using the different types of data as described above. Specifically, the court case decision may include a plurality of words or sentences that can be categorized as rationales, such as a positive description associated with the plaintiff, a negative description associated with the plaintiff, a positive description associated with the defendant, and a negative description associated with the defendant.

In one example, the court case decision include a statement that "the petitioner has stable parenting capacities, educational capacities and support system, and since the interested party was born, the petitioner has been acting as the primary guardian of the interested party and desires to continue serve as the primary guardian; it is observed that the interactions between the petitioner and the interested party have been normal, suggesting stable parental attachment", which may be classified and labeled as a positive description of the petitioner, and a statement that "the respondent has previously committed domestic violence, and based on theories of prevention of domestic violence, a person with history of violence may not be suitable for taking care of non-adult offspring", which may be classified and labeled as a negative description of the respondent.

In another example, the natural language text file may be a political op-ed article regarding two political parties (with each party serving as a target subject). In this example, the data storage 11 may store a plurality of natural language text files (political op-ed articles) each associated with at least two political parties. The natural language text file may be examined to determine whether the political op-ed article favors a first political party, a second political party, or neither, leading to one of three possible decisions.

In examining the political op-ed articles, texts or sentences contained in each of the political op-ed article may first be labeled using the different types of data as described above. Specifically, the political op-ed article may include a plurality of words or sentences that can be categorized as rationales, such as a positive description associated with the first political party, a negative description associated with the first political party, a positive description associated with the second political party, and a negative description associated with the second political party.

Figure 2:
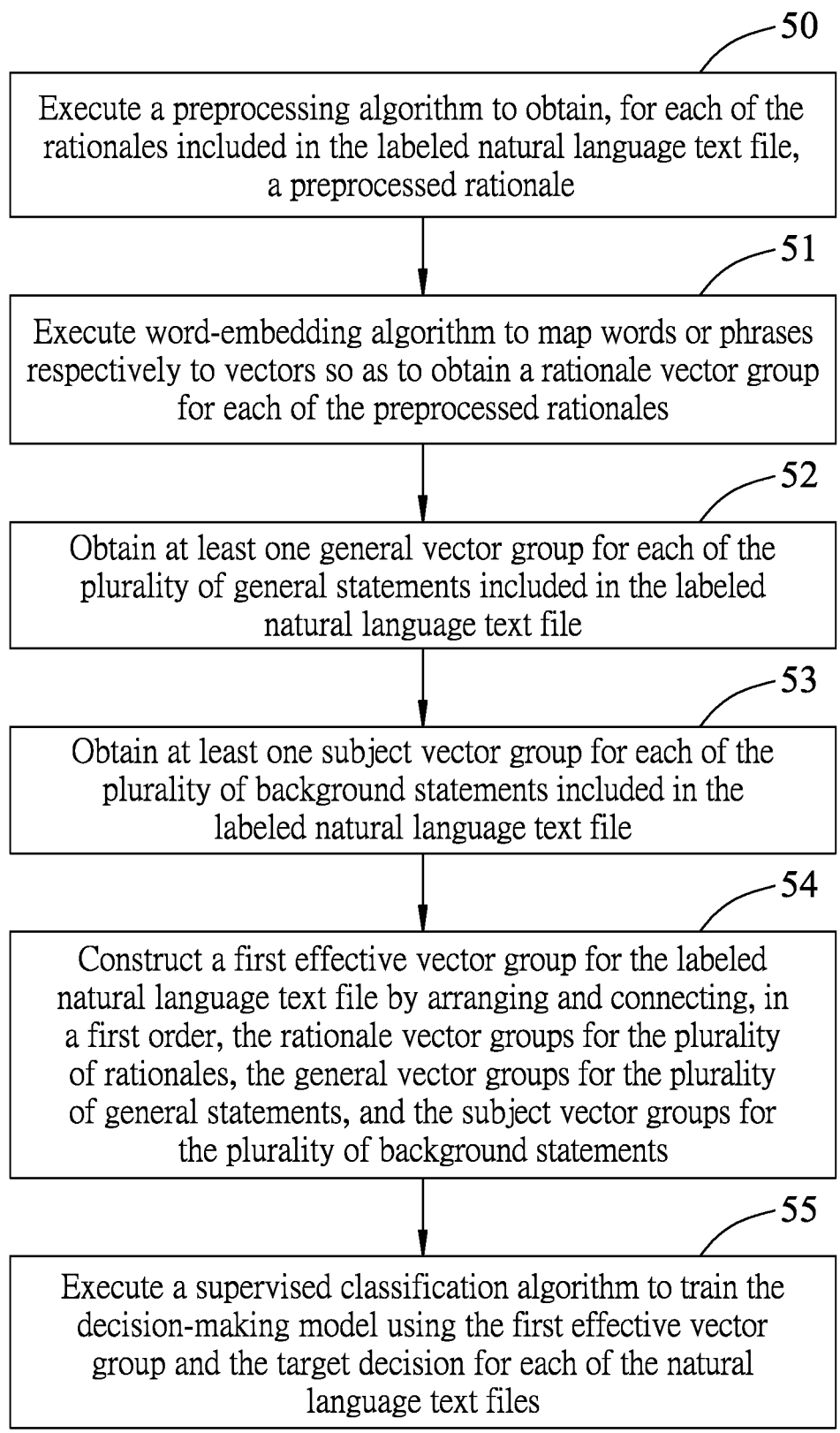
FIG. 2 is a flowchart illustrating steps of a machine-learning method for training a decision-making model with natural language corpus according to one embodiment of the disclosure.

FIG. 2 is a flowchart illustrating steps of a method for training a machine-learning based model for performing decision making associated with natural language corpus according to one embodiment of the disclosure. In this embodiment, the machine-learning method is implemented using the computer device 1 as described above, and the data storage 11 stores a plurality of labeled natural language text files as described above.

In step 50, for each of the labeled natural language text files, the processor 13 is programmed to execute a preprocessing algorithm to obtain, for each of the rationales included in the labeled natural language text file, a preprocessed rationale.

In this embodiment, the preprocessing algorithm may perform one or more of the following operations: tokenizing, removing stopwords, stemming, part of speech (PoS) tagging, name entity recognition (NER), and n-gram processing.

Specifically, the preprocessing algorithm used for English corpus may be Natural Language Toolkit (NLTK), while the library "Jieba" written in Python is employed to perform the tokenizing for Mandarin corpus.

Afterward, in step 51, the processor 13 executes word-embedding algorithm to map words or phrases respectively to vectors so as to obtain a rationale vector group for each of the preprocessed rationales. Specifically, the term "vector group" may be referred to as a plurality of a multi-dimensional vectors, and may include one or more components.

In this embodiment, the word-embedding algorithm is "Doc2vec", but may be other available algorithms in other embodiments.

For example, in embodiments that the audio input/output module 14 is available, the processor 13 may control the speaker to output an audio reading of each of the rationales, and control the audio receiving component to receive the audio reading of each of the rationales. Then, for the audio reading of each of the rationales, the processor 13 may execute another type of a word-embedding algorithm (such as the Speech2vec algorithm) to obtain the rationale vector group based on the audio reading of the rationale.

In step 52, for each of the labeled natural language text files, the processor 13 obtains at least one general vector group for each of the plurality of general statements included in the labeled natural language text file. Specifically, in performing step 52, the processor 13 may employ a pre-stored corresponding table that includes a plurality of pre-defined general statements and a plurality of pre-defined vector groups that correspond with the pre-defined general statements, respectively.

In step 53, for each of the labeled natural language text files, the processor 13 obtains at least one subject vector group for each of the plurality of background statements included in the labeled natural language text file. Specifically, in performing step 53, the processor 13 may employ a pre-stored corresponding table that includes a plurality of pre-defined background statements and a plurality of pre-defined vector groups that correspond with the pre-defined background statements, respectively.

In step 54, for each of the natural language text files, the processor 13 constructs a first effective vector group for the labeled natural language text file by arranging and connecting the rationale vector groups for the plurality of rationales, the general vector groups for the plurality of general statements, and the subject vector groups for the plurality of background statements in the given order, which serves as a first order. It is noted that the first order may be a user-defined order in other embodiments.

It is noted that in one embodiment, for each of the natural language text files, the processor 13 may construct the first effective vector group by connecting only the rationale vector groups for the plurality of rationales. In another embodiment, for each of the natural language text files, the processor 13 may construct the first effective vector group by connecting only the rationale vector groups for the plurality of rationales and the general vector groups for the plurality of general statements. In another embodiment, the processor 13 may construct the first effective vector group by connecting only the rationale vector groups for the plurality of rationales and the subject vector groups for the plurality of background statements.

In the example where each of the natural language text files is an application for admission to a school filed by a candidate (the target subject), with the rationales labeled, step 54 may be implemented by connecting the rationale vector groups for the rationales associated with the family background of the candidate, the personal hobbies of the candidate, the academic performance of the candidate, the experiences of group work of the candidate, the future plans for learning of the candidate, the general vector groups for the plurality of general statements, and the subject vector groups for the plurality of background statements in the first order so as to obtain the first effective vector group.

In the example where each of the natural language text files is a court case decision, with the rationales labeled, step 54 may be implemented by connecting the rationale vector group for the rationale obtained using the word-embedding algorithm and associated with the positive description of the plaintiff, the rationale vector group for the rationale obtained using the word-embedding algorithm and associated with the negative description of the plaintiff, the rationale vector group for the rationale obtained using the word-embedding algorithm and associated with the positive description of the defendant, the rationale vector group for the rationale obtained using the word-embedding algorithm and associated with the negative description of the defendant, the general vector groups for the plurality of general statements, and the subject vector groups for the plurality of background statements using the first order, so as to obtain the first effective vector group.

In step 55, the processor 13 executes a supervised classification algorithm to train the decision-making model using the first effective vector group and the target decision for each of the natural language text files. It is noted that the decision-making model is trained to be configured to make a decision for an unlabeled natural language text file by labeling the unlabeled natural language text file using one of the potential decisions that serves as a target decision, and to display a result of the labeling (i.e., the labeled target decision) on the display 12.

It is noted that in this embodiment, the supervised classification algorithm is embodied using an artificial neural network (ANN), and may be other algorithms in other embodiments.

In one embodiment, for each of the natural language text files, the processor 13 may perform the machine-learning method with a vector dataset for the natural language text file. The vector dataset is associated with a pre-labeled target decision included in a plurality of potential decisions, and includes a plurality of rationale vector groups. Each of the rationale vector groups is associated with a natural language text included in the natural language text file or an audio reading of the natural language text describing the target subject.

Specifically, the vector dataset may be obtained from other electronic devices via the communication component, and may be pre-stored in the data storage 11. In use, the processor 13 may perform steps 54 and 55 so as to train the decision-making model.

Figure 3:
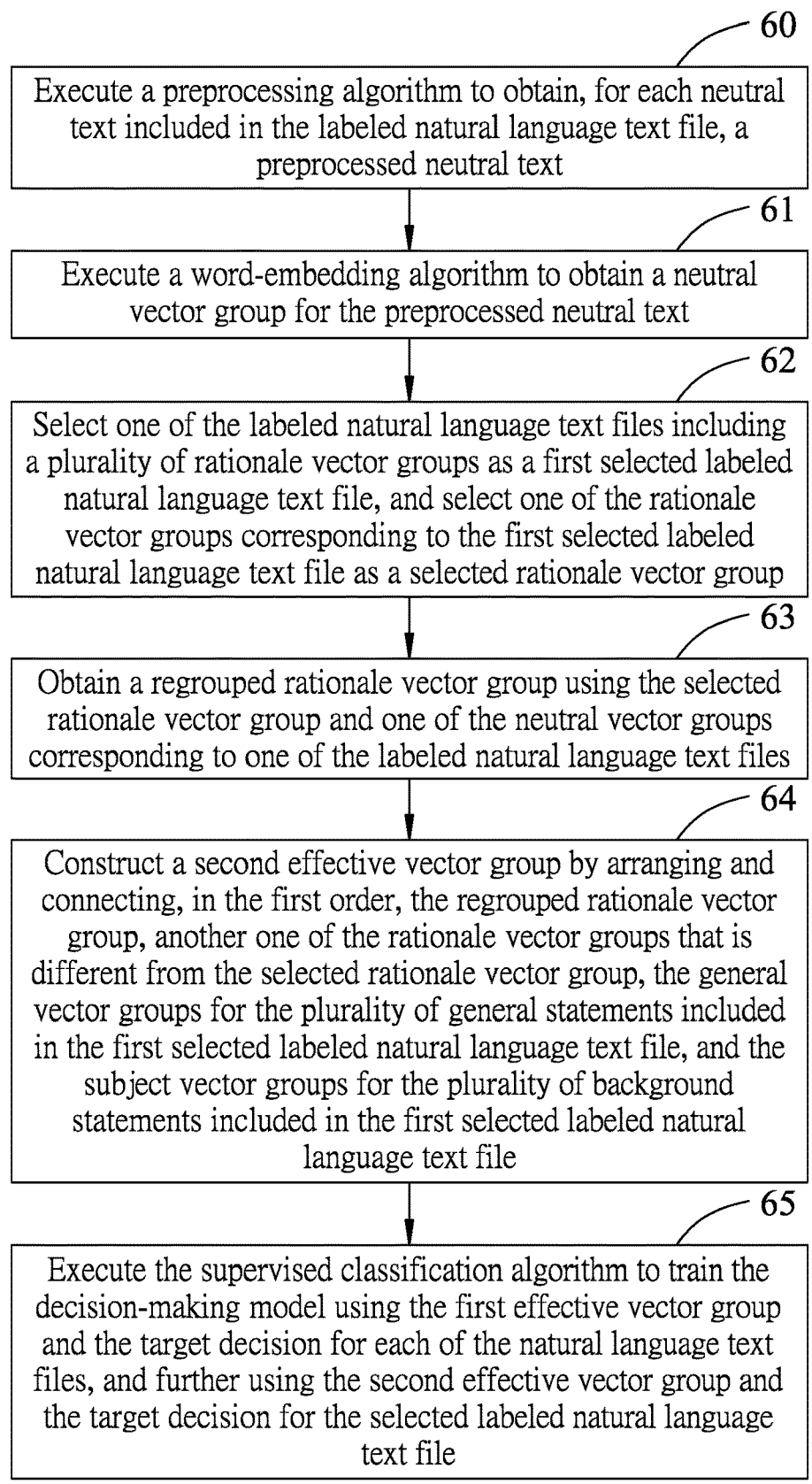
FIG. 3 is a flowchart illustrating steps of a machine-learning method for training a decision-making model with natural language corpus, including a neutral data augmentation procedure, according to another embodiment of the disclosure.

FIG. 3 is a flowchart illustrating steps of a machine-learning method for training a decision-making model with natural language corpus according to one embodiment of the disclosure. In this embodiment, the machine-learning method is implemented using the computer device 1 as described above, and the data storage 11 stores a plurality of labeled natural language text files as described above.

It is noted that the machine-learning method as described in FIG. 3 may be suitable for use with the labeled natural language text files that include descriptions of one or more target subjects (i.e., include rationales associated with one or more target subjects), such as court case decisions.

Specifically, in this embodiment, the goal is to generate additional data from the labeled natural language text files originally stored in the data storage 11, an operation known as data augmentation.

In step 60, for each of the labeled natural language text files, the processor 13 is programmed to execute a preprocessing algorithm to obtain, for each of the neutral text included in the labeled natural language text file, a preprocessed neutral text.

In step 61, the processor 13 executes a word-embedding algorithm to obtain a neutral vector group for each of the preprocessed neutral text.

In this embodiment, the word-embedding algorithm is "Doc2vec", but may be other algorithms, such as the Speech2vec algorithm as described above, in other embodiments. It is noted that the operations of step 61 may be done in a manner similar to that of step 51.

In step 62, the processor 13 selects one of the labeled natural language text files as a first selected labeled natural language text file, and selects one of the rationale vector groups originated from the first selected labeled natural language text file as a selected rationale vector group. The selection may be done by using a random generator.

In step 63, the processor 13 obtains a regrouped rationale vector group using the selected rationale vector group and one of the neutral vector groups corresponding to each one of the labeled natural language text files.

Specifically, in this embodiment, the processor 13 calculates an arithmetic average of the selected rationale vector group and the one of the neutral vector group.

It is noted that in some embodiments, a plurality of rationale vector groups may be selected in step 62, and step 63 may be performed with respect to each of the selected rationale vector groups.

In step 64, the processor 13 constructs a second effective vector group by arranging and connecting, in the first order, the regrouped rationale vector group, another one of the selected rationale vector groups that is different from the selected rationale vector group, the general vector groups for the plurality of general statements included in the first selected labeled natural language text file, and the subject vector groups for the plurality of background statements included in the first selected labeled natural language text file.

It is noted that in one embodiment, the processor 13 may construct the second effective vector group by connecting only the regrouped rationale vector group and another one of the rationale vector groups.

In another embodiment, the processor 13 may construct the second effective vector group by connecting only the regrouped rationale vector group, the another one of the rationale vector groups, and the general vector groups for the plurality of general statements included in the first selected labeled natural language text file.

In another embodiment, the processor 13 may construct the second effective vector group by connecting only the regrouped rationale vector group, the another one of the rationale vector groups, and the subject vector groups for the plurality of background statements included in the first selected labeled natural language text file.

It is noted that, the regrouped rationale vector group, which originates from the neutral text of the first selected labeled natural language text file, should have no impact on the target decision. As such, a target decision associated with the second effective vector group should be the target decision associated with the first selected labeled natural language text file.

In one implementation, using the case where the first selected labeled natural language text file is a court case decision as an example, in step 62, the processor 13 may select the rationale vector group for the positive description associated with the plaintiff, and the rationale vector group for the negative description associated with the plaintiff to serve as the selected rationale vector groups.

Then, in step 63, the processor 13 obtains two regrouped rationale vector groups, one using the selected rationale vector group for the positive description associated with the plaintiff and one of the neutral vector groups (designated as a first regrouped rationale vector group), and the other using the selected rationale vector group for the negative description associated with the plaintiff and the one of the neutral vector groups (designated as a second regrouped rationale vector group).

In step 64, the processor 13 constructs the second effective vector group by connecting the first regrouped rationale vector group, the second regrouped rationale vector group, a rationale vector group for the positive description associated with the defendant, a rationale vector group for the negative description associated with the defendant, the general vector groups for the plurality of general statements included in the first selected labeled natural language text file, and the subject vector groups for the plurality of background statements included in the first selected labeled natural language text file.

The second effective vector group thus constructed is therefore different from the first effective vector group, but with the same target decision. As such, the second effective vector group may be used as training material for the decision-making model. It is noted that the operation of steps 60 to 64 may be referred to as a neutral data augmentation procedure.

In step 65, the processor 13 executes the supervised classification algorithm to train the decision-making model using the first effective vector group and the target decision for each of the natural language text files, and further using the second effective vector group and the target decision for the selected labeled natural language text file.

In one embodiment, the processor 13 may perform the machine-learning method by obtaining a neutral augmented vector dataset for one natural language text file. The neutral augmented vector dataset is associated with a pre-labeled target decision included in a plurality of potential decisions, and includes the regrouped rationale vector group, the another one of the rationale vector groups, and the target decision for the selected labeled natural language text file.

Specifically, the neutral augmented vector dataset may be obtained using other electronic devices, and may be pre-stored in the data storage 11. In use, the processor 13 may perform steps 64 and 65 so as to train the decision-making model.

Figure 4:
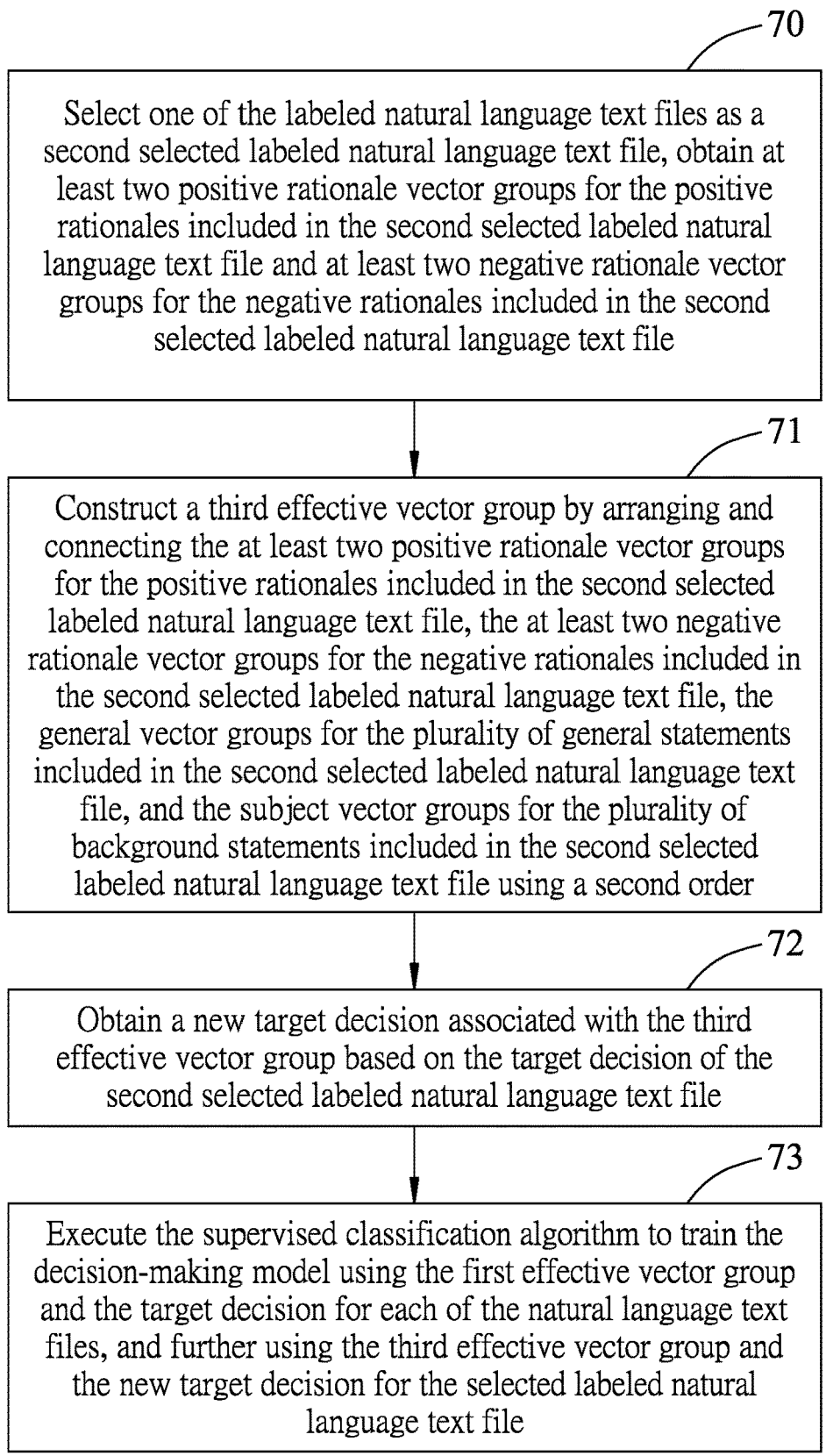
FIG. 4 is a flowchart illustrating steps of an exchange data augmentation procedure for generating training material that is used for training the decision-making model according to one embodiment of the disclosure.

FIG. 4 is a flowchart illustrating steps of an exchange data augmentation procedure for generating training material that is used for training the decision-making model according to one embodiment of the disclosure. In this embodiment, the machine-learning method is implemented using the computer device 1 as described above, and the data storage 11 stores a plurality of labeled natural language text files as described above.

It is noted that the procedure as described in FIG. 4 may be suitable for use with the labeled natural language text files each including descriptions related to multiple target subjects (i.e., including a plurality of rationales associated with the target subjects), such as court case decisions. In some embodiments, the procedure may be performed with the machine-learning method as shown in FIG. 3 for generating the training material.

In step 70, the processor 13 selects one of the labeled natural language text files as a second selected labeled natural language text file, obtains at least two positive rationale vector groups for the positive rationales included in the second selected labeled natural language text file and at least two negative rationale vector groups for the negative rationales included in the second selected labeled natural language text file.

In step 71, the processor 13 constructs a third effective vector group by arranging and connecting the at least two positive rationale vector groups for the positive rationales included in the second selected labeled natural language text file, the at least two negative rationale vector groups for the negative rationales included in the second selected labeled natural language text file, the general vector groups for the plurality of general statements included in the second selected labeled natural language text file, and the subject vector groups for the plurality of background statements included in the second selected labeled natural language text file using a second order.

Specifically, the second order is defined by exchanging an order of the at least two positive rationale vector groups according to the first order and exchanging an order of the at least two negative rationale vector groups according to the first order.

It is noted that in one embodiment, the processor 13 may construct the third effective vector group by connecting only the at least two positive rationale vector groups for the positive rationales included in the second selected labeled natural language text file and the at least two negative rationale vector groups for the negative rationales included in the second selected labeled natural language text file.

In another embodiment, the processor 13 may construct the third effective vector group by connecting only the at least two positive rationale vector groups for the positive rationales included in the second selected labeled natural language text file, the at least two negative rationale vector groups for the negative rationales included in the second selected labeled natural language text file, and the general vector groups for the plurality of general statements included in the second selected labeled natural language text file.

In another embodiment, the processor 13 may construct the third effective vector group by connecting only the at least two positive rationale vector groups for the positive rationales included in the second selected labeled natural language text file, the at least two negative rationale vector groups for the negative rationales included in the second selected labeled natural language text file, and the subject vector groups for the plurality of background statements included in the second selected labeled natural language text file.

In one example, the second selected labeled natural language text file is associated with two target subjects, two positive rationale vector groups (a first positive rationale vector group and a second positive rationale vector group), and two negative rationale vector groups (a first negative rationale vector group and a second negative rationale vector group). The first positive rationale vector group and the first negative rationale vector group are associated with a first target subject, and the second positive rationale vector group and the second negative rationale vector group are associated with a second target subject.

In this example, in constructing the third effective vector group, the processor 13 may connect the first positive rationale vector group, the second positive rationale vector group, the first negative rationale vector group and the second negative rationale vector group using the first order. If the second order is used, the processor 13 would construct the third effective vector group by connecting the second positive rationale vector group, the first positive rationale vector group, the second negative rationale vector group and the first negative rationale vector group.

It is noted that, a rationale vector group that is connected as a first member in the first order is associated with the first target subject, a rationale vector group that is connected as a second member in the first order is associated with the second target subject, a rationale vector group that is connected as a third member in the first order is associated with the first target subject, a rationale vector group that is connected as a fourth member in the first order is associated with the second target subject.

By using the second order, the rationales describing the target subjects are exchanged. That is, the decision-making model fed with the third effective vector group now "views" the first target subject using the rationales describing the second target subject, and views the second target subject using the rationales describing the first target subject.

In one example, the second selected labeled natural language text file is associated with three target subjects, three positive rationale vector groups (a first positive rationale vector group, a second positive rationale vector group, and a third positive rationale vector group), and three negative rationale vector groups (a first negative rationale vector group a second negative rationale vector group, and a third negative rationale vector group). The first positive rationale vector group and the first negative rationale vector group are associated with a first target subject, the second positive rationale vector group and the second negative rationale vector group are associated with a second target subject, and the third positive rationale vector group and the third negative rationale vector group are associated with a third target subject.

In this example, in constructing the third effective vector group, the processor 13 may connect the first positive rationale vector group, the second positive rationale vector group, the third positive rationale vector group, the first negative rationale vector group, the second negative rationale vector group, and the third negative rationale vector group using the first order. On the other hand, in the second order, the processor 13 may construct the third effective vector group by connecting the second positive rationale vector group, the first positive rationale vector group, the third positive rationale vector group, the second negative rationale vector group, the first negative rationale vector group, and the third negative rationale vector group.

Similarly, the decision-making model fed with the third effective vector group now "views" the first target subject using the rationales describing the second target subject, and views the second target subject using the rationales describing the first target subject.

It is noted that in addition to the above mentioned second order, various orders that are different from the first order may be employed for generating the third effective vector group.

In step 72, the processor 13 obtains a new target decision associated with the third effective vector group based on the target decision of the second selected labeled natural language text file.

Specifically, since the descriptions of the target subjects are exchanged with one another, the new decision associated with the third effective vector group should be different from that of the target decision of the second selected labeled natural language text file.

In the example with two target subjects, three potential decisions may be present: favoring the first target subject (e.g., a plaintiff), favoring the second target subject (e.g., a defendant), or not favoring either of the target subjects.

As such, when the second selected labeled natural language text file is associated with the target decision of favoring the first target subject, the new decision associated with the third effective vector group should be favoring the second target subject. When the second selected labeled natural language text file is associated with the target decision of favoring the second target subject, the new decision associated with the third effective vector group should be favoring the first target subject. When the second selected labeled natural language text file is associated with the target decision of not favoring either of the target subjects, the new decision associated with the third effective vector group should be unchanged.

That is to say, in the original court case decision, after viewing the positive/negative rationales associated with the plaintiff and the defendant, a decision favoring the plaintiff or the defendant may be reached. In constructing the third effective vector group, since the rationales describing the plaintiff are now associated with the defendant and the rationales describing the defendant are now associated with the plaintiff, an opposite decision should be reached as the new decision.

In the example with three target subjects, four potential decisions may be present: favoring the first target subject (e.g., a first political party or candidate), favoring the second target subject (e.g., a second political party or candidate), favoring the third target subject (e.g., a third political party or candidate), or not favoring any of the target subjects.

As such, when the second selected labeled natural language text file is associated with the target decision of favoring the first target subject, the new decision associated with the third effective vector group should be favoring the second target subject. When the second selected labeled natural language text file is associated with the target decision of favoring the second target subject, the new decision associated with the third effective vector group should be favoring the first target subject. When the second selected labeled natural language text file is associated with the target decision of favoring the third target subject or not favoring any of the target subjects, the new decision associated with the third effective vector group should be unchanged.

Using the above procedure, additional training material may be obtained to train the decision-making model.

In this embodiment, the flow may proceed to step 73, in which the processor 13 trains the decision-making model by further using the third effective vector group and the new decision.

In one embodiment, the processor 13 may perform the procedure by obtaining an exchange augmented vector dataset for one natural language text file. The exchange augmented vector dataset includes the third effective vector group and the new decision. The exchange augmented vector dataset may be obtained using other electronic devices, and may be pre-stored in the data storage. In use, the processor 13 may perform step 65 so as to train the decision-making model.

It is noted that the above exchange data augmentation procedure may be unsuited for specific natural language text files that do not involve a plurality of target subjects (i.e., only involving one target subject).

Figure 5:
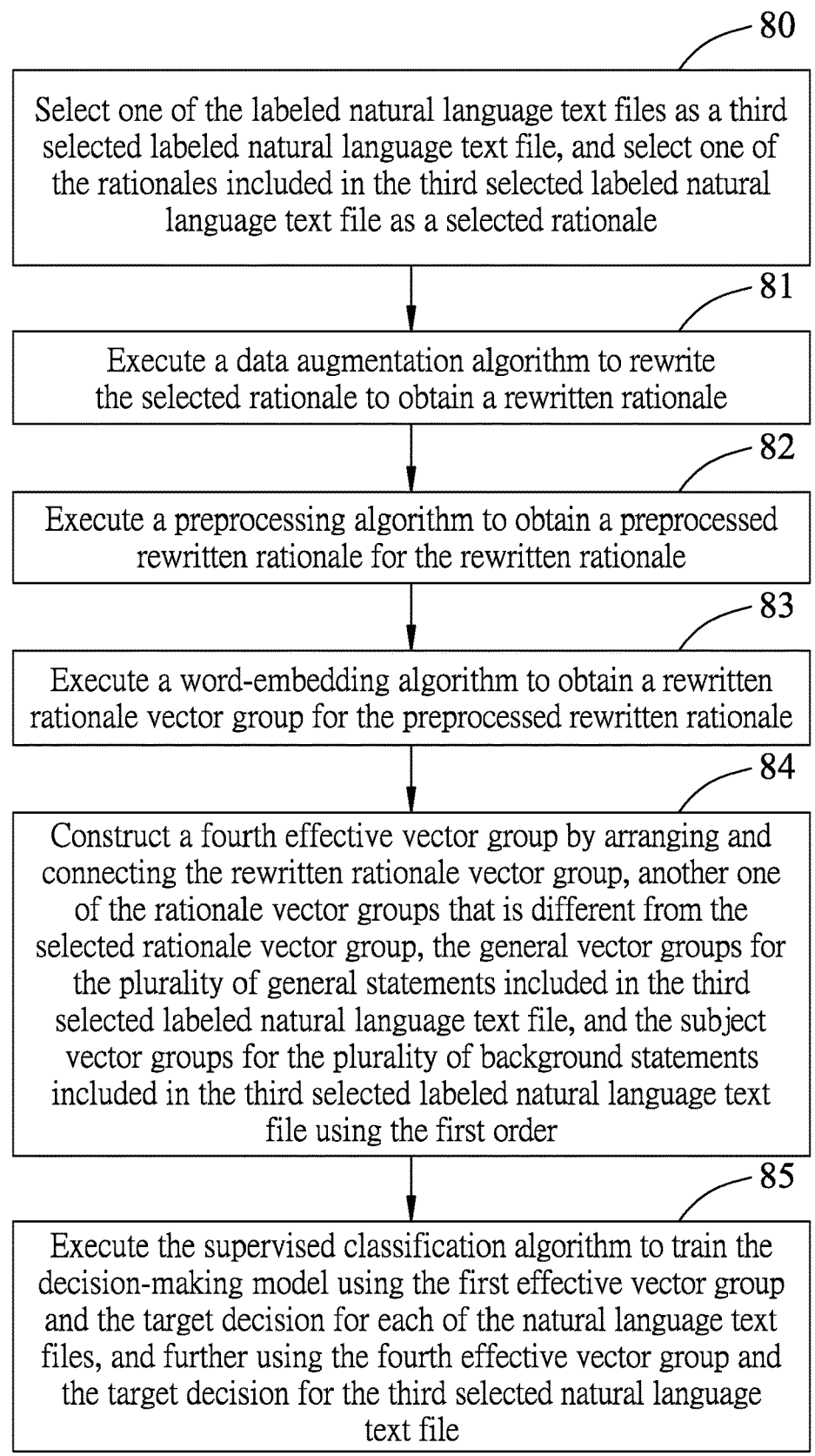
FIG. 5 is a flowchart illustrating steps of a rewriting data augmentation procedure for generating training material that is used for training the decision-making model according to one embodiment of the disclosure.

FIG. 5 is a flowchart illustrating steps of a rewriting data augmentation procedure for generating training material that is used for training the decision-making model according to one embodiment of the disclosure. In this embodiment, the machine-learning method is implemented using the computer device 1 as described above, and the data storage 11 stores a plurality of labeled natural language text files as described above.

In step 80, the processor 13 selects one of the labeled natural language text files as a third selected labeled natural language text file, and selects one of the rationales included in the third selected labeled natural language text file as a selected rationale.

In step 81, the processor 13 executes a data augmentation algorithm to rewrite the selected rationale to obtain a rewritten rationale.

For example, the third selected labeled natural language text file is written in Mandarin, and the augmentation algorithm may be embodied using easy data augmentation (EDA) natural language processing (NLP) for Chinese corpus. In one embodiment, step 81 may be implemented by translating the selected rationale into another language (e.g., English) and translating back to the original language (i.e., Mandarin). It is noted that various ways are readily available for rewriting the rationale to obtain the rewritten rationale.

In step 82, the processor 13 executes a preprocessing algorithm to obtain a preprocessed rewritten rationale for the rewritten rationale.

In step 83, the processor 13 executes a word-embedding algorithm to obtain a rewritten rationale vector group for the preprocessed rewritten rationale. In this embodiment, the word-embedding algorithm is "Doc2vec", and may be other algorithms, such as the Speech2vec algorithm as described above, in other embodiments.

In step 84, the processor 13 constructs a fourth effective vector group by arranging and connecting the rewritten rationale vector group, another one of the rationale vector groups that is different from the selected rationale vector group, the general vector groups for the plurality of general statements included in the third selected labeled natural language text file, and the subject vector groups for the plurality of background statements included in the third selected labeled natural language text file using the first order.

It is noted that in one embodiment, the processor 13 may construct the fourth effective vector group by connecting only the rewritten rationale vector group and another one of the rationale vector groups.

In another embodiment, the processor 13 may construct the fourth effective vector group by connecting only the rewritten rationale vector group, the another one of the rationale vector groups, and the general vector groups for the plurality of general statements included in the third selected labeled natural language text file.

In another embodiment, the processor 13 may construct the fourth effective vector group by connecting only the rewritten rationale vector group, the another one of the rationale vector groups, and the subject vector groups for the plurality of background statements included in the third selected labeled natural language text file.

In some embodiments, a plurality of rationales in the third selected labeled natural language text file may be selected as the selected rationales, and a rewritten rationale vector group may be obtained for each of the selected rationales. Then, the rewritten rationale vector groups may be used to construct the fourth effective vector group.

It is noted that, the rewritten rationale should have a meaning that is substantially the same with that of the selected rationale. As such, a target decision associated with the fourth effective vector group, which is constructed using the rewritten rationale, should be the same with the target decision of the third selected labeled natural language text file.

In one example where the third selected labeled natural language text file is a court case decision, in step 80, the processor 13 may select a first positive rationale vector group and a first negative rationale vector group as the selected rationales.

Then, in step 81, the processor 13 executes the data augmentation algorithm to rewrite the selected rationales to obtain two rewritten rationales (referred to as a first rewritten rationale and a second rewritten rationale).

Afterward, the processor 13 executes the preprocessing algorithm to obtain first and second preprocessed rewritten rationales respectively for the first and second rewritten rationales, and executes the word-embedding algorithm to obtain first and second rewritten rationale vector groups respectively for the first and second preprocessed rewritten rationales. It is noted that the rewritten rationale vector groups are different from the rationale vector groups since the rationales have been rewritten, and the corresponding vectors are therefore changed as well.

Then, in step 84, the processor 13 constructs the fourth effective vector group by connecting the first rewritten rationale vector group, the second rewritten rationale vector group, the second positive rationale vector group, the second negative rationale vector group, the general vector groups for the plurality of general statements included in the third selected labeled natural language text file, and the subject vector groups for the plurality of background statements included in the third selected labeled natural language text file using the first order. It is noted that the fourth effective vector group thus generated is also different from the first effective vector group, in which the rationales have not been rewritten.

As such, the fourth effective vector group may be used as new training material for the decision-making model.

In step 85, the processor 13 executes the supervised classification algorithm to train the decision-making model using the first effective vector group and the target decision for each of the natural language text files, and further using the fourth effective vector group and the target decision for the third selected natural language text file.

In one embodiment, the processor 13 may perform the machine-learning method by obtaining a rewritten augmented vector dataset for one selected labeled natural language text file. The rewritten augmented vector dataset includes at least one rewritten rationale vector group and the target decision for the selected labeled natural language text file.

Specifically, the rewritten augmented vector dataset may be obtained using other electronic devices, and may be pre-stored in the data storage 14. In use, the processor 13 may perform steps 84 and 85 so as to train the machine-learning based model.

To sum up, the embodiments of the disclosure provide a machine-learning method for training a decision-making model for with a natural language text file including various kinds of natural language corpus. The machine-learning method enables a processor to transform one or more pre-labeled rationale included in the natural language text file into an effective vector group, which may be used as training material for training the machine-learning based model.

One advantage of the machine-learning method is that the machine-learning method eliminates the availability bias which comes from the human defined questionnaire (i.e., not all related features can be considered as options of the questionnaire before actual labeling, since there may exist features that have never been thought about, but actually included in the text data). Instead, by using the rationale, which is natural language data included in the original natural language text file, more information may be preserved for training decision-making model, and therefore a higher accuracy may be achieved.

Additionally, the embodiments provide a number of ways for performing data augmentation (i.e., the neutral data augmentation procedure, the exchange data augmentation procedure, and the rewrite data augmentation procedure) so as to generate additional data serving as training material. This may assist in addressing the issue of reduced efficiency of the training due to an insufficient amount of training material. Moreover, in the case of exchange data augmentation procedure, the potential issue of bias of the machine-learning based model due to the sampling of the original training material may be alleviated.

As such, the machine-learning based model may be trained to perform decision making with reduced bias, and may be useful in many applications in various fields.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A machine-learning method for training a decision-making model with natural language corpus, the machine-learning method being implemented using a computer device including a data storage and a processor communicating with the data storage, the data storage storing a plurality of labeled natural language text files, each of the plurality of labeled natural language text files being associated with a pre-labeled target decision included in a plurality of potential decisions, and including a plurality of pre-labeled rationales associated with a target subject, for each of the plurality of labeled natural language text files, the pre-labeled rationales of the labeled natural language text file including at least one positive rationale associated with a positive description of the target subject, and at least one negative rationale associated with a negative description of the target subject, the machine-learning method comprising steps of:

a) for each of the labeled natural language text files, obtaining, by the processor, at least one rationale vector group for each of the plurality of rationales included in the labeled natural language text file;

b) constructing, by the processor, a first effective vector group for the labeled natural language text file by connecting the rationale vector groups respectively for the plurality of rationales using a first order; and c) executing, by the processor, a supervised classification algorithm to train the decision-making model using the first effective vector group and the target decision for each of the natural language text files, wherein the decision-making model is trained to be configured to label an unlabeled natural language text file using one of the potential decisions that serves as a target decision;

wherein:
   step a) includes obtaining at least one positive rationale vector group for the positive rationale included in the labeled natural language text file and at least one negative rationale vector group for the negative rationale included in the labeled natural language text file; and step b) includes constructing the first effective vector group for the labeled natural language text file by connecting the at least one positive rationale vector group and the at least one negative rationale vector group using the first order.

2. The machine-learning method of claim 1, wherein step a) includes:
   for each of the rationales, executing a preprocessing algorithm to obtain a preprocessed rationale; and
   executing a word-embedding algorithm to obtain the rationale vector group based on the preprocessed rationale.

3. The machine-learning method of claim 1, the computer device further including an audio receiving component communicating with the processor, wherein step a) includes:

controlling the audio receiving component to receive an audio reading of each of the rationales; and for the audio reading of each of the rationales, executing a word-embedding algorithm to obtain the rationale vector group based on the audio reading of the rationale.

4. The machine-learning method of claim 1, each of the plurality of labeled natural language text files further including at least one neutral text that is not associated with the target subject, the machine-learning method further comprising steps of, prior to step c):

d) for each of the labeled natural language text files, obtaining, by the processor, a neutral vector group for the at least one neutral text included in the labeled natural language text file;

e) selecting one of the labeled natural language text files including a plurality of rationale vector groups as a selected labeled natural language text file, and selecting one of the rationale vector groups included in the selected labeled natural language text file as a selected rationale vector group;

f) obtaining a regrouped rationale vector group using the selected rationale vector group and one of the neutral vector groups included in one of the labeled natural language text files; and g) constructing, by the processor, a second effective vector group by connecting the regrouped rationale vector group and another one of the rationale vector groups that is different from the selected rationale vector group using the first order;

wherein step c) further includes training the decision-making model using the second effective vector group and the target decision for the selected labeled natural language text file.

5. The machine-learning method of claim 1, for each of the plurality of labeled natural language text files, the pre-labeled rationales of the labeled natural language text file including at least two positive rationales each associated with a positive description of a corresponding one of two target subjects, and at least two negative rationales each associated with a negative description of a corresponding one of the two target subjects, wherein step a) includes selecting one of the labeled natural language text files including a plurality of rationale vector groups as a selected labeled natural language text file, obtaining at least two positive rationale vector groups for the positive rationales included in the selected labeled natural language text file and at least two negative rationale vector groups for the negative rationales included in the selected labeled natural language text file;

the machine-learning method further comprising steps of, after step b):

h) constructing, by the processor, a second effective vector group by connecting the at least two positive rationale vector groups for the positive rationales included in the selected labeled natural language text file and the at least two negative rationale vector groups for the negative rationales included in the selected labeled natural language text file using a second order, wherein the second order is defined by exchanging an order of the two positive rationale vector groups according to the first order and exchanging an order of the two negative rationale vector groups according to the first order; and i) obtaining, by the processor, a new decision associated with the second effective vector group based on the target decision;

wherein step c) further includes training the decision-making model using the second effective vector group and the new decision.

6. The machine-learning method of claim 1, further comprising steps of, prior to step c):

j) selecting one of the labeled natural language text files including a plurality of rationale vector groups as a selected labeled natural language text file, and selecting one of the rationales as a selected rationale;

k) executing a data augmentation algorithm to rewrite the selected rationale to obtain a rewritten rationale;

l) Obtaining a rewritten rationale vector group for the rewritten rationale; and m) constructing a second effective vector group by connecting the rewritten rationale vector group and one of the rationale vector groups that is different from the rewritten rationale vector group using the first order;

wherein step c) further includes training the decision-making model using the second effective vector group and the target decision for the selected labeled natural language text file.

7. The machine-learning method of claim 1, wherein each of the plurality of labeled natural language text files is associated with an event and includes a plurality of pre-labeled general statements, the machine-learning method further comprising a step of, prior to step b):

n) for each of the labeled natural language text files, obtaining, by the processor, a general vector group for each of the plurality of general statements included in the labeled natural language text file;

wherein step b) includes constructing the first effective vector group for the labeled natural language text file by connecting the rationale vector groups for the plurality of rationales and the general vector groups respectively for the plurality of general statements using the first order.

8. The machine-learning method of claim 7, wherein the pre-labeled general statements include a location associated with the event.

9. The machine-learning method of claim 1, wherein each of the plurality of labeled natural language text files includes a plurality of pre-labeled background statements associated with the target subject, the machine-learning method further comprising, prior to step b), a step of:

o) for each of the labeled natural language text files, obtaining, by the processor, a subject vector group for each of the plurality of background statements included in the labeled natural language text file;

wherein step b) includes constructing the first effective vector group for the labeled natural language text file by connecting the rationale vector groups for the plurality of rationales and the subject vector groups respectively for the plurality of background statements using the first order.

10. The method of claim 9, wherein the target subject is a human, and the background statements include a gender of the target subject.

* * * * *